US010540975B2

(12) United States Patent
Begum et al.

(10) Patent No.: US 10,540,975 B2
(45) Date of Patent: Jan. 21, 2020

(54) TECHNOLOGIES FOR AUTOMATIC SPEECH RECOGNITION USING ARTICULATORY PARAMETERS

(71) Applicant: Intel Corporation, Santa Clara, CA (US)

(72) Inventors: Shamim Begum, Beaverton, OR (US); Alexander A. Oganezov, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 15/080,687

(22) Filed: Mar. 25, 2016

(65) Prior Publication Data

US 2017/0278517 A1    Sep. 28, 2017

(51) Int. Cl.
*G10L 15/25* (2013.01)
*G10L 15/06* (2013.01)
*G10L 25/75* (2013.01)
*G10L 15/18* (2013.01)
*G10L 15/26* (2006.01)

(52) U.S. Cl.
CPC ............ *G10L 15/25* (2013.01); *G10L 15/063* (2013.01); *G10L 25/75* (2013.01); *G10L 15/18* (2013.01); *G10L 15/26* (2013.01)

(58) Field of Classification Search
CPC ....... G10L 15/25; G10L 15/063; G10L 25/75; G10L 15/26; G10L 15/18
USPC ........................................................ 704/255
See application file for complete search history.

(56) References Cited

U.S. PATENT DOCUMENTS

| 6,449,595 B1 | 9/2002 | Arslan et al. |
| 6,735,566 B1 | 5/2004 | Brand |
| 9,263,044 B1 * | 2/2016 | Cassidy ............... G06K 9/00 |

(Continued)

FOREIGN PATENT DOCUMENTS

WO    2003100767    12/2003

OTHER PUBLICATIONS

Huang, "Articulatory Speech Synthesis and Speech Production Modeling," Ph.D. Thesis, University of Illinois (2001).

(Continued)

*Primary Examiner* — Bharatkumar S Shah
(74) *Attorney, Agent, or Firm* — Barnes & Thornburg LLP (57) ABSTRACT

Technologies for automatic speech recognition using articulatory parameters are disclosed. An automatic speech recognition device may capture speech data from a speaker and also capture an image of the speaker. The automatic speech recognition device may determine one or more articulatory parameters based on the image, such as such as a jaw angle, a lip protrusion, or a lip height, and compare those parameters with articulatory parameters of training users. After selecting training users with similar articulatory parameters as the training speaker, the automatic speech recognition device may select training data associated with the selected training speakers, including parameters to use for an automatic speech recognition algorithm. By using the parameters already optimized for training users with similar articulatory parameters as the speaker, the automatic speech recognition device may quickly adapt an automatic speech recognition algorithm to the speaker.

25 Claims, 6 Drawing Sheets

(56) References Cited

U.S. PATENT DOCUMENTS

2014/0278418 A1* 9/2014 Chen .................. G10L 17/00
704/246
2016/0322046 A1* 11/2016 Lahiri .................. G10L 25/75

OTHER PUBLICATIONS

Padmanabhan et al., "Speaker Clustering and Transformation for Speaker Adaptation in Speech Recognition Systems," IEEE Trans. on Speech and Aud. Proc., 6, 71 (1998).

Katsamanis et al., "Face Active Appearance Modeling and Speech Acoustic Information to Recover Articulation", IEEE Transactions on Audio, Speech, and Language Processing, vol. 17, No. 3, Mar. 2009, pp. 411-422.

Levinson et al., "Articulatory Speech Synthesis from the Fluid Dynamics of the Vocal Apparatus", Morgan & Claypool Publishers, 2012, 115 pages.

Nefian et al., "An Embedded HMM-Based Approach for Face Detection and Recognition", Georgia Institute of Technology, School of Electrical and Computer Engineering, Center for Signal and Image Processing, Atlanta, Georgia 30332, 4 pages.

Palo, "A Review of Articulatory Speech Synthesis", Helsinki University of Technology, Department of Electrical and Communications Engineering, Laboratory of Acoustics and Audio Signal Processing, Jun. 5, 2006, 142 pages.

Shunji, "Estimated From the Voice of an Unknown Person's Face—Gender of Influence (English Translation)", The 75th Annual Convention of the Japanese Psychological Association, 2011, 3 pages.

Sotelo et al., "Who Said That? The Crossmodal Matching Identity for Inferring Unfamiliar Faces From Voices", 5 IEEE Computer Society, Eighth International Conference on Signal Image Technology and Internet Based Systems, 2012, pp. 97-107.

U.S. Appl. No. 14/496,832 by Shamim Begum and Alexander A. Oganezov, filed Sep. 25, 2014.

* cited by examiner

TECHNOLOGIES FOR AUTOMATIC SPEECH RECOGNITION USING ARTICULATORY PARAMETERS

BACKGROUND

Despite the computational ability of modern compute devices, certain tasks such as automatic speech recognition remain challenging. There has been significant progress with automatic speech recognition using phoneme recognition, hidden Markov models, deep learning, and similar techniques. Automatic speech recognition can be done using a speaker-independent algorithm or a speaker-dependent algorithm.

Speaker-dependent algorithms can be adapted to recognize speech of a specific individual with better performance than a similar speaker-independent algorithm. The speaker-dependent algorithm may require significant training, such as extensive speech data of the individual corresponding to known text. In some speaker-dependent algorithms, the training may be done with less speech data of the individual speaking by comparing speech data of the individual to speech data of known training users.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
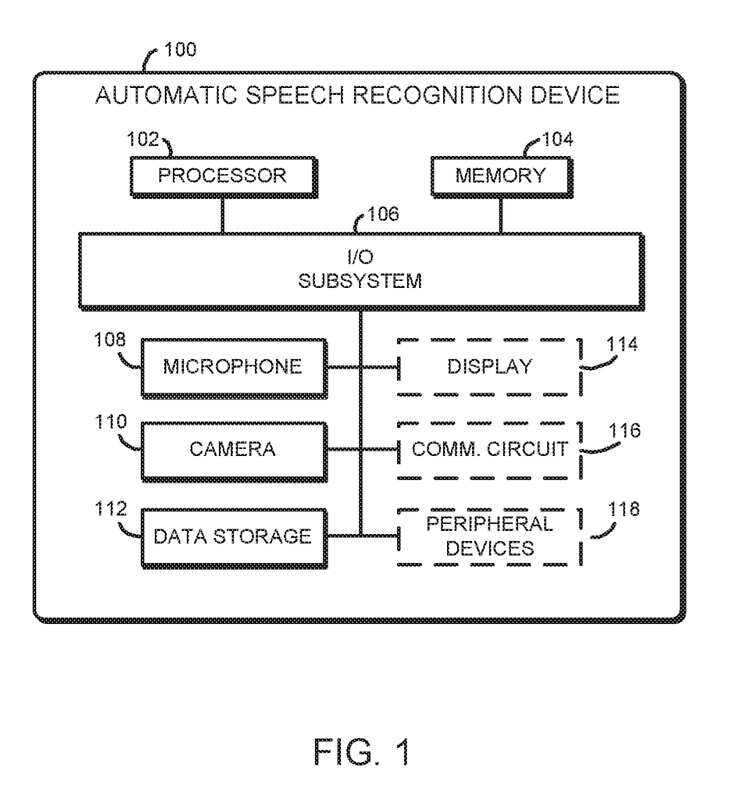
FIG. 1 is a simplified block diagram of at least one embodiment of an automatic speech recognition device.

Referring now to FIG. 1, an illustrative automatic speech recognition device 100 includes a microphone 108 and a camera 110. In use and as described in more detail below, the illustrative automatic speech recognition device 100 captures speech data of a speaker using the microphone 108 and captures an image of the speaker using the camera 110. The automatic speech recognition device 100 determines one or more visible articulatory parameters based on the image of the speaker, such as a jaw angle, a lip protrusion, or a lip height, and compares the visible articulatory parameters with those of training users stored in the automatic speech recognition device 100. Based on the comparison, the automatic speech recognition device 100 selects training users, and uses training data corresponding to the training users to determine one or more parameters of an automatic speech recognition algorithm. The automatic speech recognition device then performs automatic speech recognition on the captured speech data using the determined parameters and the automatic speech recognition algorithm.

The automatic speech recognition device 100 may be embodied as any type of compute device capable of performing the functions described herein. For example, the automatic speech recognition device 100 may be embodied as or otherwise be included in, without limitation, a smartphone, a cellular phone, an embedded computing system, a System-on-a-Chip (SoC), a desktop computer, a server computer, a tablet computer, a notebook computer, a laptop computer, a wearable computer, a handset, a messaging device, a camera device, a multiprocessor system, a processor-based system, a consumer electronic device, and/or any other computing device. The illustrative automatic speech recognition device 100 includes a processor 102, a memory 104, an input/output (I/O) subsystem 106, the microphone 108, the camera 110, and data storage 112. In some embodiments, one or more of the illustrative components of the automatic speech recognition device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the automatic speech recognition device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the automatic speech recognition device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the automatic speech recognition device 100 on a single integrated circuit chip.

The microphone 108 may be embodied as any type of device capable of converting sound into an electrical signal. To do so, the microphone 108 may utilize any type of suitable sound capture technology including, but not limited to electromagnetic induction, capacitance change, and/or piezoelectricity.

The camera 110 may be embodied as any type of device capable of sensing or capturing one or more image(s). For example, the camera 110 may be embodied as, or otherwise include a charge-coupled device (CCD) image sensor, a complementary metal-oxide-semiconductor (CMOS) image sensor, and/or other type of image sensor technology. Additionally, the camera 110 may be embodied as a two-dimensional or a three-dimensional camera (i.e., configured to capture/generate 2D or 3D images). The camera 110 may be configured to sense single or multiple images (e.g., video), and may sense visible light and/or invisible light, including infrared light, thermal light, ultra-violet light, x-rays, and/or the like.

The data storage 112 may be embodied as any type of device or devices configured for the short-term or long-term storage of data. For example, the data storage 112 may include any one or more memory devices and circuits, memory cards, hard disk drives, solid-state drives, or other data storage devices.

Of course, in some embodiments, the automatic speech recognition device 100 may include other or additional components, such as those commonly found in a compute device. For example, the automatic speech recognition device 100 may also have a display 114, a communication circuit 116, and/or peripheral devices 118 such as a keyboard, a mouse, etc.

The display 114 may be embodied as any type of display on which information may be displayed to a user of the automatic speech recognition device 100, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

The communication circuit 116 may be embodied as any type of communication circuit, device, or collection thereof, capable of enabling communications between the automatic speech recognition device 100 and other devices. To do so, the communication circuit 116 may be configured to use any one or more communication technology and associated protocols (e.g., Ethernet, Bluetooth®, Wi-Fi®, WiMAX, near field communication (NFC), etc.) to effect such communication.

Figure 2:
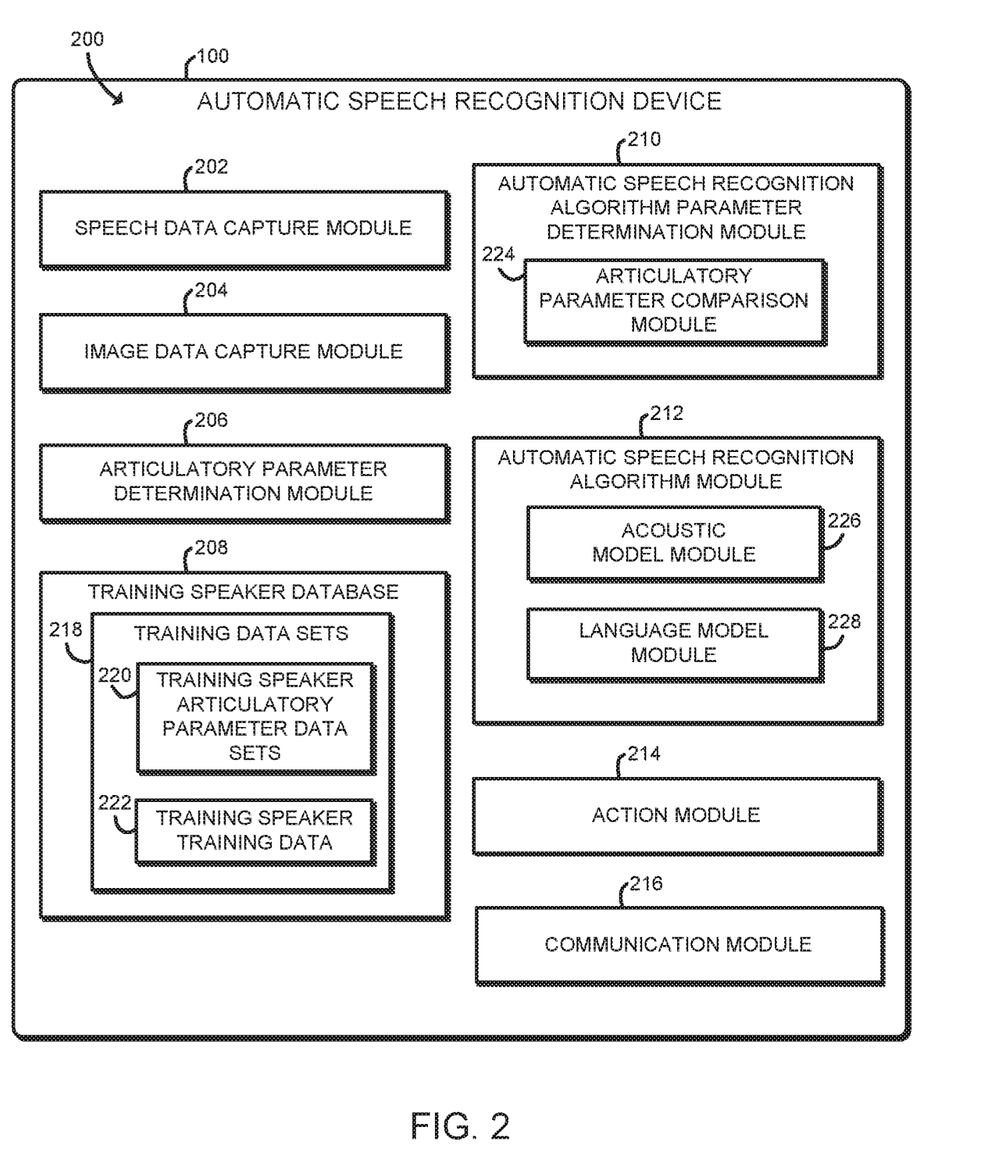
FIG. 2 is a block diagram of at least one embodiment of an environment that may be established by the automatic speech recognition device of FIG. 1.

Referring now to FIG. 2, in use, the automatic speech recognition device 100 may establish an environment 200. The illustrative environment 200 includes a speech data capture module 202, an image data capture module 204, an articulatory parameter determination module 206, a training speaker database 208, an automatic speech recognition algorithm parameter determination module 210, an automatic speech recognition algorithm module 212, an action module 214, and a communication module 216. The various modules of the environment 200 may be embodied as hardware, software, firmware, or a combination thereof. For example, the various modules, logic, and other components of the environment 200 may form a portion of, or otherwise be established by, the processor 102 or other hardware components of the automatic speech recognition device 100. As such, in some embodiments, one or more of the modules of the environment 200 may be embodied as circuitry or collection of electrical devices (e.g., a speech data capture circuit 202, an image data capture circuit 204, an articulatory parameter determination circuit 206, etc.). It should be appreciated that, in such embodiments, one or more of the circuits (e.g., the speech data capture circuit 202, the image data capture circuit 204, the articulatory parameter determination circuit 206, etc.) may form a portion of one or more of the processor 102, the memory 104, the I/O subsystem 106, and/or the data storage 112. Additionally, in some embodiments, one or more of the illustrative modules may form a portion of another module and/or one or more of the illustrative modules may be independent of one another.

The speech data capture module 202 is configured to capture or otherwise acquire speech data of a speaker. It should be appreciated that, throughout this disclosure, when referring to a "speaker," the speaker is an individual person (and not, e.g., an electromechanical device for producing sound). In the illustrative embodiment, the speech data capture module 202 captures speech data from the microphone 108. Additionally or alternatively, the speech data capture module 202 may acquire speech data that has been previously captured from the microphone 108 or from a microphone of a different compute device, such as by accessing data storage 112 or by receiving the speech data from the communication circuit 116. In the illustrative embodiment, the speech data directly indicates a waveform of the sound produced by the speaker (i.e., pressure as a function of time). In other embodiments, the speech data may indirectly indicate the waveform after it has been manipulated or transformed. For example, the speech data may represent the Fourier transform of the waveform.

The image data capture module 204 is configured to capture or otherwise acquire an image of the speaker. In the illustrative embodiment, the image data capture module 204 captures an image of the speaker using the camera 110. Additionally or alternatively, the image data capture module 204 may acquire an image of the speaker that has been previously captured from the camera 110 or from a camera of a different compute device, such as by accessing data storage 112 or by receiving the image from the communication circuit 116.

The articulatory parameter determination module 206 is configured to determine or otherwise acquire articulatory parameter data indicative of one or more articulatory parameters of the speaker. The articulatory parameters may illustratively include any physical aspect of the speaker that affects the speaker's articulation of words. As such, in the illustrative embodiment, the articulatory parameter determination module 206 is configured to analyze an image of the user and determine one or more visible articulatory parameters, such as a tongue radius, a tongue height, a jaw angle, a lip protrusion, a lip height, etc., and/or a facial structure of the speaker. Additionally or alternatively, the articulatory parameter determination module 206 may acquire articulatory parameters of the speaker that have been previously determined by the articulatory parameter determination module 206 or by a different compute device, such as by accessing data storage 112 or by receiving the articulatory parameters from the communication circuit 116. In some embodiments the articulatory parameters may include articulatory parameters that are not typically visible, such data relating to the vocal cords of the user. It should be appreciated that, as used throughout this disclosure, the articulatory parameter data indicative of one or more articulatory parameters of the speaker does not include speech data of the speaker or parameters derived exclusively therefrom, even if that speech data correlates to or is otherwise indicative of articulatory parameters of the speaker.

The training speaker database 208 is configured to store data relating to training data of training speakers. Each entry in the database includes a training data set 218 associated with a training speaker, and each training data set 218 includes a training speaker articulatory parameter data set 220 and training speaker training data 222. The training speaker articulatory parameter data set 220 includes data indicative of articulatory parameters of the corresponding training speaker, and the training speaker training data 222 includes additional data that may be used for training an automatic speech recognition algorithm, such as training speech data of training speaker with a corresponding known text. The training speaker training data 222 may also include parameters determined based on the training speech data for one or more automatic speech recognition algorithms, such as a neural-network-based algorithm, a support-vector-machine-based algorithm, and/or the like.

The automatic speech recognition algorithm parameter determination module 210 is configured to determine one or more parameters of an automatic speech recognition algorithm based on the articulatory parameter data. In the illustrative embodiment, the automatic speech recognition algorithm parameter determination module 210 uses an articulatory parameter comparison module 224 to acquire training data of one or more training speakers by comparing the articulatory parameter data of the speaker with articulatory parameter data sets of training speakers and selecting the training speakers with similar articulatory parameters as the speaker. The automatic speech recognition algorithm parameter determination module 210 is further configured to determine one or more parameters for an automatic speech recognition module based on the training data.

The automatic speech recognition algorithm module 212 is configured to perform an automatic speech recognition algorithm based on the parameters determined by the automatic speech recognition algorithm parameter determination module 210. The automatic speech recognition algorithm used may be any type of automatic speech recognition algorithm, including an algorithm based on machine learning such as a neural network, a support vector machine, and/or the like. In the illustrative embodiment, the automatic speech recognition algorithm module 212 includes an acoustic model module 226 and a language model module 228. The acoustic model module 226 is configured to determine one or more phonemes based on the speech data, and the language model module 228 is configured to transcribe one or more words based on the determined phonemes. In some embodiments, the language model module 228 may use natural language processing. Each of the acoustic model module 226 and the language model module 228 may employ any kind of algorithm, including algorithms based on machine-learning such as a neural network, a support vector machine, and/or the like. In some embodiments, the automatic speech recognition algorithm module 212 may transcribe the words directly from the speech data without explicitly determining the phonemes.

The action module 214 is configured to perform an action based on the transcribed words. For example, the action module 214 may set an appointment, launch an application, send an e-mail or text message, etc. In some embodiments, the action module 214 may display the transcribed text on the display 114 or store the transcribed text in the memory 104 or the data storage 112 without taking any further action.

The communication module 216 is configured to communicate with other compute devices. For example, in some embodiments, the communication module 216 may receive an image of the user or may receive articulatory parameters of the user. As discussed above, the communication module 216 may communicate through, for example, Ethernet, Bluetooth®, Wi-Fi®, WiMAX, near field communication (NFC), etc.

Figure 3:
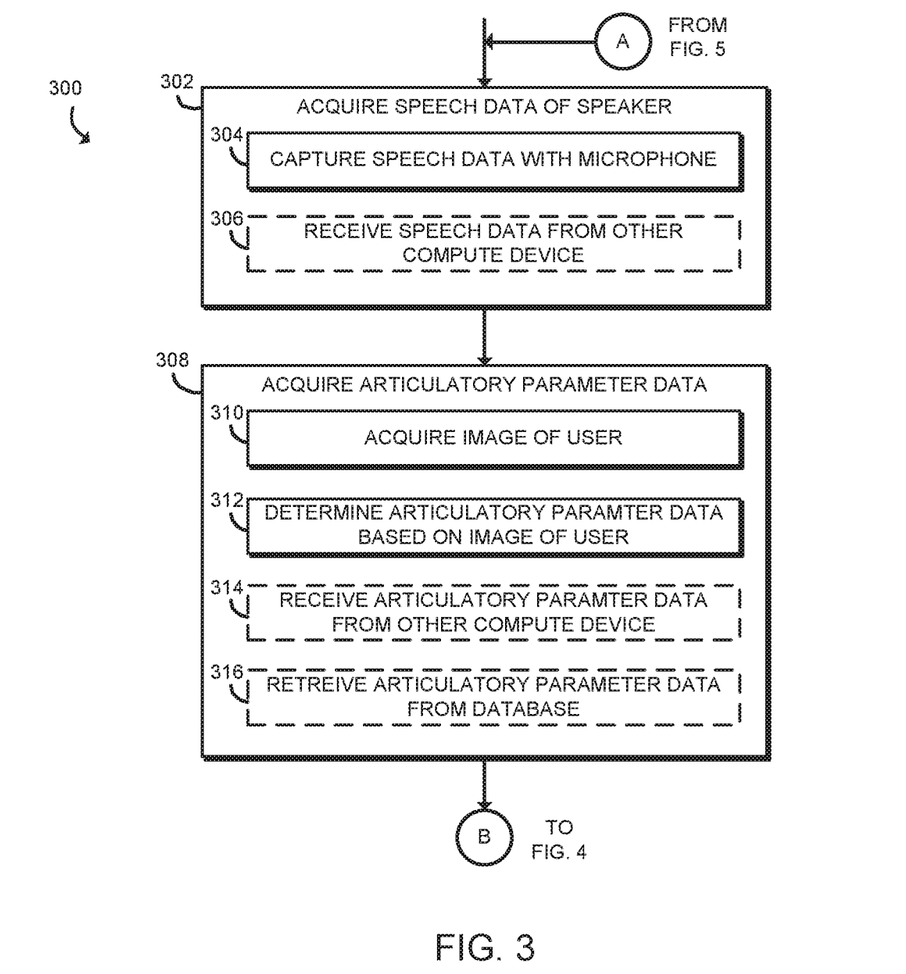
FIGS. 3-5 are a simplified flow diagram of at least one embodiment of a method for automatic speech recognition that may be executed by the automatic speech recognition device of FIG. 1.

Referring now to FIG. 3, in use, the automatic speech recognition device 100 may execute a method 300 for automatic speech recognition. The method 300 begins in block 302, in which the automatic speech recognition device 100 acquires speech data of a speaker. In the illustrative embodiment, the automatic speech recognition device 100 captures the speech data with the microphone 108 in block 304. In other embodiments the automatic speech recognition device 100 may acquire the speech data through other means, such as by receiving it from another compute device in block 306.

In block 308, the automatic speech recognition device 100 acquires articulatory parameter data indicative of one or more articulatory parameters of the speaker. In the illustrative embodiment, the automatic speech recognition device 100 acquires an image of the user in block 310 using the camera 110, and determines articulatory parameter data based on the image of the user in block 312. In other embodiments, the automatic speech recognition device 100 may acquire an image of the speaker from another compute device or from storage of the automatic speech recognition device 100. In some embodiments, the automatic speech recognition device 100 may receive articulatory parameters from another compute device in block 314 or may acquire articulatory parameter data from a database of the automatic speech recognition device 100 in block 316. As discussed above, the articulatory parameters include visible articulatory parameters such as a tongue radius, a tongue height, a jaw angle, a lip protrusion, a lip height, etc. In some embodiments, the articulatory parameters may be indicative of a facial structure of the user. In some embodiments, the articulatory parameters may include articulatory parameters that are not typically visible, such as data relating to the vocal cords of the speaker. After block 308, the method 300 continues to block 318 of FIG. 4.

Figure 4:
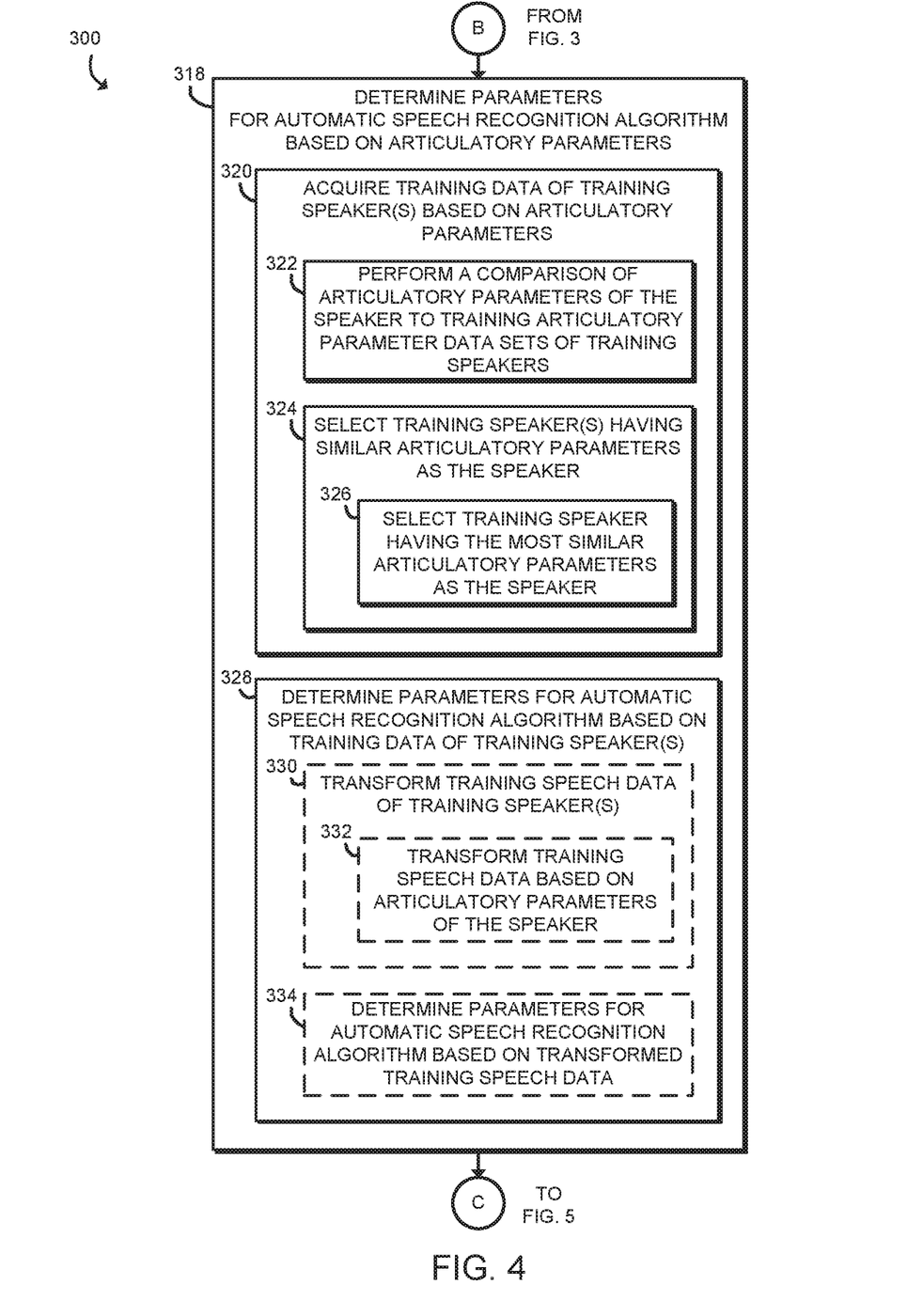

In block 318 of FIG. 4, the automatic speech recognition device 100 determines parameters for an automatic speech recognition algorithm based on the articulatory parameters of the speaker. To do so, the automatic speech recognition device 100 first acquires training data of training speakers based on the articulatory parameters of the speaker in block 320. The automatic speech recognition device 100 performs a comparison in block 322 of the articulatory parameters of the speaker with training articulatory parameter data sets stored in the training speaker database 208. In block 324, automatic speech recognition device 100 selects entries in the training speaker database 208 associated with training speakers having similar articulatory parameters as the speaker. In some embodiments, the automatic speech recognition device 100 may do so by determining a numerical score indicative of a similarity between the articulatory parameters of the speaker and each training articulatory parameter data sets associated with the training speakers and selecting the entries with the scores indicating a high similarity (e.g., by comparing the similarity to a threshold similarity). In the illustrative embodiment, the automatic speech recognition device 100 selects at least the entry associated with the training speaker having the most similar articulatory parameters as the speaker in block 326, and may do so based on the score indicating the highest similarity.

In block 328, the automatic speech recognition device 100 determines one or more parameters for an automatic speech recognition algorithm based on the training data of the training speakers. In some embodiments, the automatic speech recognition device 100 may select the parameters stored in the database entry having the most similar articulatory parameters as the speaker without modification. In other embodiments, automatic speech recognition device 100 may select parameters for an automatic speech recognition algorithm from one or more entries of the database and modify them (e.g., by averaging them or by modifying them based on the speech data).

In some embodiments, the automatic speech recognition device 100 may transform training speech data of the selected training speakers in block 330 to be more similar to the speech data of the speaker by, e.g., applying a filter or other transformation to the speech data. In block 332, the automatic speech recognition device 100 may transform the training speech data based on the articulatory parameters of the speaker. The automatic speech recognition device 100 may then determine parameters for an automatic speech recognition algorithm based on the transformed training speech data.

In some embodiments, the automatic speech recognition device 100 may determine parameters of a speech recognition algorithm directly based on the articulatory parameters of the speaker, without needing to make any comparison with articulatory parameters of training speakers. After block 318, the method 300 continues to block 336 of FIG. 5.

Figure 5:
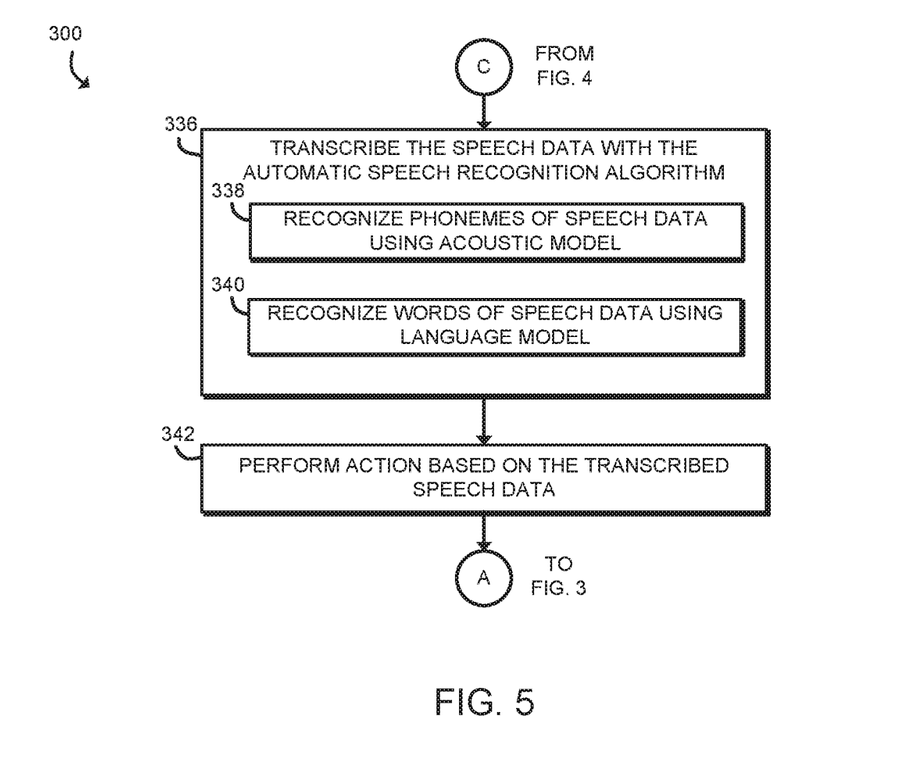

In block 336 of FIG. 5, the automatic speech recognition device 100 transcribes the speech data using the automatic speech recognition algorithm and the parameters determined in block 318. In the illustrative embodiment, the automatic speech recognition device 100 recognizes phonemes of the speech data in block 338, and recognizes words of the speech data using a language model in block 340.

In block 342, the automatic speech recognition device 100 performs an action based on the transcribed speech data, such as setting an appointment, launching an application, sending an e-mail or text message, etc. In some embodiments, the automatic speech recognition device 100 may display the transcribed text on the display 114 or store the transcribed text in the memory 104 or the data storage 112 without taking any further action.

It should be appreciated that, in some embodiments, the automatic speech recognition device 100 may not necessarily perform every block shown in FIG. 5. For example, in some embodiments, the automatic speech recognition device 100 may acquire articulatory parameter data of a speaker as in block 308 and determine parameters for an automatic speech recognition algorithm as in block 318, but may not necessarily transcribe speech data of the speaker or even acquire speech data of the speaker.

Figure 6:
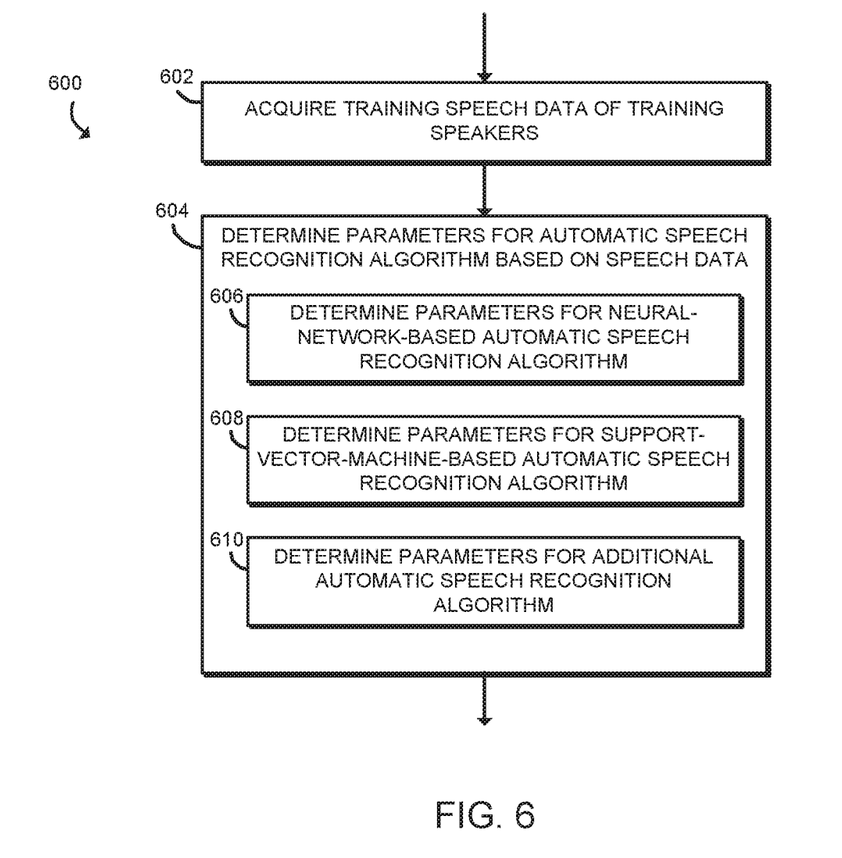
FIG. 6 is a simplified flow diagram of at least one embodiment of a method for determining training data that may be executed by the automatic speech recognition device of FIG. 1.

Referring now to FIG. 6, in use, the automatic speech recognition device 100 may execute a method 600 for populating the training speaker database 208. In block 602, the automatic speech recognition device 100 acquires training speech data of training speakers. In the illustrative embodiment, the automatic speech recognition device 100 receives the speech data from another compute device, but in some embodiments the automatic speech recognition device 100 may capture some or all of the training speech data using the microphone 108. In the illustrative embodiment, the automatic speech recognition device 100 also receives text corresponding to the speech data (e.g., a transcription of the speech data), but in other embodiments the text may not be available.

In block 604, the automatic speech recognition device 100 determines one or more parameters for each of one or more automatic speech recognition algorithms by, for example, using machine learning based on the training speech data and/or based on the training speech data and corresponding text. In block 606, the automatic speech recognition device 100 may determine parameters for a neural-network-based automatic speech recognition algorithm In block 608, the automatic speech recognition device 100 may determine parameters for a support-vector-machine-based automatic speech recognition algorithm In block 610, the automatic speech recognition device 100 may determine parameters for an additional automatic speech recognition algorithm.

Of course, in some embodiments, the automatic speech recognition device 100 may not perform the method 600 to populate the training speaker database 208 for every entry, but may instead receive some or all of the entries from another compute device.

EXAMPLES

Illustrative examples of the devices, systems, and methods disclosed herein are provided below. An embodiment of the devices, systems, and methods may include any one or more, and any combination of, the examples described below.

Example 1 includes an automatic speech recognition device comprising an articulatory parameter determination module to acquire articulatory parameter data indicative of one or more articulatory parameters of a speaker; and an automatic speech recognition algorithm parameter determination module to determine, based on the articulatory parameter data, one or more parameters of an automatic speech recognition algorithm.

Example 2 includes the subject matter of Example 1, and wherein the articulatory parameter data comprises visible articulatory parameter data.

Example 3 includes the subject matter of any of Examples 1 and 2, and wherein the visible articulatory parameter data is indicative of a facial structure of the speaker.

Example 4 includes the subject matter of any of Examples 1-3, and wherein the visible articulatory parameter data is indicative of at least one of a tongue radius, a tongue height, a jaw angle, a lip protrusion, or a lip height.

Example 5 includes the subject matter of any of Examples 1-4, and further including a camera and an image data capture module to capture an image of the speaker, wherein to acquire the articulatory parameter data indicative of the one or more articulatory parameters of the speaker comprises to determine articulatory parameter data indicative of one or more articulatory parameters of the speaker based on the image.

Example 6 includes the subject matter of any of Examples 1-5, and further including a communication module to receive, from a compute device, an image of the speaker, wherein to acquire the articulatory parameter data indicative of the one or more articulatory parameters of the speaker comprises to determine articulatory parameter data indicative of one or more articulatory parameters of the speaker based on the image.

Example 7 includes the subject matter of any of Examples 1-6, and further including a communication module, wherein to acquire the articulatory parameter data indicative of the one or more articulatory parameters of the speaker comprises to receive, by the communication module, articulatory parameter data indicative of one or more articulatory parameters of a speaker.

Example 8 includes the subject matter of any of Examples 1-7, and wherein to determine the one or more parameters of the automatic speech recognition algorithm comprises to acquire, based on the articulatory parameter data, training data associated with one or more training speakers; and determine one or more parameters of an automatic speech recognition algorithm based on the training data.

Example 9 includes the subject matter of any of Examples 1-8, and further including a training speaker database comprising a plurality of entries, wherein to acquire the training data associated with the one or more training speakers comprises to access the training speaker database, wherein each entry of the plurality of entries is associated with a different training speaker, wherein each entry of the plurality of entries comprises a training data set, and wherein each training data set comprises a training speaker articulatory parameter data set associated with the corresponding different training speaker and training speaker training data associated with the corresponding different training speaker.

Example 10 includes the subject matter of any of Examples 1-9, and wherein to acquire the training data associated with the one or more training speakers comprises to select, by the automatic speech recognition device and based on the articulatory parameter data and the plurality of training speaker articulatory parameter data sets of the training speaker database, training speaker training data associated with one or more training speakers from the training speaker database.

Example 11 includes the subject matter of any of Examples 1-10, and wherein the articulatory parameter determination module is further to perform a comparison of the articulatory parameter data and the plurality of training speaker articulatory parameter data sets of the training speaker database, wherein to select the training speaker training data associated with the one or more training speakers comprises to select, based on the comparison, one or more entries of the plurality of entries with training articulatory parameter data similar to the articulatory parameter data.

Example 12 includes the subject matter of any of Examples 1-11, and wherein to select the one or more entries of the plurality of entries with training articulatory parameter data sets similar to the articulatory parameter data comprises to select one entry of the plurality of entries with a training articulatory parameter data set most similar to the articulatory parameter data.

Example 13 includes the subject matter of any of Examples 1-12, and wherein to perform the comparison of the articulatory parameter data and the plurality of training articulatory parameter data sets of the training speaker database comprises to determine, for each entry of the plurality of entries, a numerical score indicative of a similarity between the articulatory parameter data and each training articulatory parameter data set, wherein to select the training data associated with the one or more training speakers comprises to select, based on the numerical score for each entry of the plurality of entries, training speaker training data associated with one or more training speakers.

Example 14 includes the subject matter of any of Examples 1-13, and wherein the training speaker training data associated with the one or more training speakers comprises training speech data of each training speaker of the one or more training speakers and corresponding transcribed text data.

Example 15 includes the subject matter of any of Examples 1-14, and wherein the automatic speech recognition algorithm parameter determination module is further to acquire speech data of the speaker; transform the training speech data of each training speaker of the one or more training speakers based on the speech data.

Example 16 includes the subject matter of any of Examples 1-15, and wherein the automatic speech recognition algorithm parameter determination module is further to transform the training speech data of each training speaker of the one or more training speakers based on the articulatory parameter data.

Example 17 includes the subject matter of any of Examples 1-16, and wherein the training speaker training data associated with the one or more training speakers comprises one or more training speaker parameters of the automatic speech recognition algorithm.

Example 18 includes the subject matter of any of Examples 1-17, and wherein the one or more parameters comprise the one or more training speaker parameters.

Example 19 includes the subject matter of any of Examples 1-18, and further including an automatic speech recognition algorithm module to acquire speech data of the speaker; and transcribe the speech data with the automatic speech recognition algorithm using the one or more parameters.

Example 20 includes the subject matter of any of Examples 1-19, and wherein to transcribe the speech data comprises to determine, using an acoustic model, phonemes of the speech data; and determine, by the automatic speech recognition device and using a language model, words of the speech data based on the phonemes.

Example 21 includes the subject matter of any of Examples 1-20, and further including a microphone and a speech data capture module, wherein to acquire the speech data of the speaker comprises to capture, by the speech data capture module, the speech data of the speaker.

Example 22 includes the subject matter of any of Examples 1-21, and further including a communication module, wherein to acquire the speech data of the speaker comprises to receive, by the communication module, the speech data of the speaker.

Example 23 includes the subject matter of any of Examples 1-22, and further including an action module to perform an action based on the transcribed speech data.

Example 24 includes a method for automatic speech recognition comprising acquiring, by an automatic speech recognition device, speech data of a speaker; acquiring, by the automatic speech recognition device, articulatory parameter data indicative of one or more articulatory parameters of the speaker; determining, by the automatic speech recognition device and based on the articulatory parameter data, one or more parameters of an automatic speech recognition algorithm transcribing, by the automatic speech recognition device, the speech data with the automatic speech recognition algorithm using the one or more parameters.

Example 25 includes the subject matter of Example 24, and wherein the articulatory parameter data comprises visible articulatory parameter data.

Example 26 includes the subject matter of any of Examples 24 and 25, and wherein the visible articulatory parameter data is indicative of a facial structure of the speaker.

Example 27 includes the subject matter of any of Examples 24-26, and wherein the visible articulatory parameter data is indicative of at least one of a tongue radius, a tongue height, a jaw angle, a lip protrusion, or a lip height.

Example 28 includes the subject matter of any of Examples 24-27, and further including acquiring, by the automatic speech device, an image of the speaker, wherein acquiring the articulatory parameter data comprises determining, by the automatic speech recognition device, articulatory parameter data indicative of one or more articulatory parameters of the speaker based on the image.

Example 29 includes the subject matter of any of Examples 24-28, and wherein determining the one or more parameters of the automatic speech recognition algorithm comprises acquiring, by the automatic speech recognition device and based on the articulatory parameter data, training data associated with one or more training speakers; and determining, by the automatic speech recognition device and based on the training data, one or more parameters of an automatic speech recognition algorithm.

Example 30 includes the subject matter of any of Examples 24-29, and wherein acquiring the training data associated with the one or more training speakers comprises accessing a training speaker database comprising a plurality of entries, wherein each entry of the plurality of entries is associated with a different training speaker, wherein each entry of the plurality of entries comprises a training data set, and wherein each training data set comprises a training speaker articulatory parameter data set associated with the corresponding different training speaker and training speaker training data associated with the corresponding different training speaker.

Example 31 includes the subject matter of any of Examples 24-30, and wherein acquiring the training data associated with the one or more training speakers comprises selecting, by the automatic speech recognition device and based on the articulatory parameter data and the plurality of training speaker articulatory parameter data sets of the training speaker database, training speaker training data associated with one or more training speakers from the training speaker database.

Example 32 includes the subject matter of any of Examples 24-31, and further including performing a comparison of the articulatory parameter data and the plurality of training speaker articulatory parameter data sets of the training speaker database, wherein selecting the training speaker training data associated with the one or more training speakers comprises selecting, based on the comparison, one or more entries of the plurality of entries with training articulatory parameter data similar to the articulatory parameter data.

Example 33 includes the subject matter of any of Examples 24-32, and wherein selecting one or more entries of the plurality of entries with training articulatory parameter data sets similar to the articulatory parameter data comprises selecting one entry of the plurality of entries with a training articulatory parameter data set most similar to the articulatory parameter data.

Example 34 includes the subject matter of any of Examples 24-33, and wherein performing the comparison of the articulatory parameter data and the plurality of training articulatory parameter data sets of the training speaker database comprises determining, for each entry of the plurality of entries, a numerical score indicative of a similarity between the articulatory parameter data and each training articulatory parameter data set, wherein selecting the training data associated with the one or more training speakers comprises selecting, based on the numerical score for each entry of the plurality of entries, training speaker training data associated with one or more training speakers.

Example 35 includes the subject matter of any of Examples 24-34, and wherein the training speaker training data associated with the one or more training speakers comprises training speech data of each training speaker of the one or more training speakers and corresponding transcribed text data.

Example 36 includes the subject matter of any of Examples 24-35, and further including transforming, by the automatic speech recognition device, the training speech data of each training speaker of the one or more training speakers based on the speech data.

Example 37 includes the subject matter of any of Examples 24-36, and further including transforming, by the automatic speech recognition device, the training speech data of each training speaker of the one or more training speakers based on the articulatory parameter data.

Example 38 includes the subject matter of any of Examples 24-37, and wherein the training speaker training data associated with the one or more training speakers comprises one or more training speaker parameters of the automatic speech recognition algorithm.

Example 39 includes the subject matter of any of Examples 24-38, and wherein the one or more parameters comprise the one or more training speaker parameters.

Example 40 includes the subject matter of any of Examples 24-39, and wherein transcribing the speech data comprises determining, by the automatic speech recognition device and using an acoustic model, phonemes of the speech data; and determining, by the automatic speech recognition device and using a language model, words of the speech data based on the phonemes.

Example 41 includes the subject matter of any of Examples 24-40, and wherein acquiring the speech data of the speaker comprises capturing, with a microphone of the automatic speech recognition device, speech data of a speaker.

Example 42 includes the subject matter of any of Examples 24-41, and further including performing, by the automatic speech recognition device, an action based on the transcribed speech data.

Example 43 includes one or more computer-readable storage media comprising a plurality of instructions stored thereon that, when executed, cause a computing device to perform the method of any of Examples 24-42.

Example 44 includes an automatic speech recognition device comprising means for acquiring speech data of a speaker; means for acquiring articulatory parameter data indicative of one or more articulatory parameters of the speaker; means for determining, based on the articulatory parameter data, one or more parameters of an automatic speech recognition algorithm means for transcribing the speech data with the automatic speech recognition algorithm using the one or more parameters.

Example 45 includes the subject matter of Example 44, and wherein the articulatory parameter data comprises visible articulatory parameter data.

Example 46 includes the subject matter of any of Examples 44 and 45, and wherein the visible articulatory parameter data is indicative of a facial structure of the speaker.

Example 47 includes the subject matter of any of Examples 44-46, and wherein the visible articulatory parameter data is indicative of at least one of a tongue radius, a tongue height, a jaw angle, a lip protrusion, or a lip height.

Example 48 includes the subject matter of any of Examples 44-47, and further including means for acquiring an image of the speaker, wherein the means for acquiring the articulatory parameter data comprises means for determining articulatory parameter data indicative of one or more articulatory parameters of the speaker based on the image.

Example 49 includes the subject matter of any of Examples 44-48, and wherein the means for determining the one or more parameters of the automatic speech recognition algorithm comprises means for acquiring, based on the articulatory parameter data, training data associated with one or more training speakers; and means for determining, based on the training data, one or more parameters of an automatic speech recognition algorithm.

Example 50 includes the subject matter of any of Examples 44-49, and wherein the means for acquiring the training data associated with the one or more training speakers comprises means for accessing a training speaker database comprising a plurality of entries, wherein each entry of the plurality of entries is associated with a different training speaker, wherein each entry of the plurality of entries comprises a training data set, and wherein each training data set comprises a training speaker articulatory parameter data set associated with the corresponding different training speaker and training speaker training data associated with the corresponding different training speaker.

Example 51 includes the subject matter of any of Examples 44-50, and wherein the means for acquiring the training data associated with the one or more training speakers comprises means for selecting, based on the articulatory parameter data and the plurality of training speaker articulatory parameter data sets of the training speaker database, training speaker training data associated with one or more training speakers from the training speaker database.

Example 52 includes the subject matter of any of Examples 44-51, and further including means for performing a comparison of the articulatory parameter data and the plurality of training speaker articulatory parameter data sets of the training speaker database, wherein the means for selecting the training speaker training data associated with the one or more training speakers comprises means for selecting, based on the comparison, one or more entries of the plurality of entries with training articulatory parameter data similar to the articulatory parameter data.

Example 53 includes the subject matter of any of Examples 44-52, and wherein the means for selecting one or more entries of the plurality of entries with training articulatory parameter data sets similar to the articulatory parameter data comprises means for selecting one entry of the plurality of entries with a training articulatory parameter data set most similar to the articulatory parameter data.

Example 54 includes the subject matter of any of Examples 44-53, and wherein the means for performing the comparison of the articulatory parameter data and the plurality of training articulatory parameter data sets of the training speaker database comprises means for determining, for each entry of the plurality of entries, a numerical score indicative of a similarity between the articulatory parameter data and each training articulatory parameter data set, wherein the means for selecting the training data associated with the one or more training speakers comprises means for selecting, based on the numerical score for each entry of the plurality of entries, training speaker training data associated with one or more training speakers.

Example 55 includes the subject matter of any of Examples 44-54, and wherein the training speaker training data associated with the one or more training speakers comprises training speech data of each training speaker of the one or more training speakers and corresponding transcribed text data.

Example 56 includes the subject matter of any of Examples 44-55, and further including means for transforming the training speech data of each training speaker of the one or more training speakers based on the speech data.

Example 57 includes the subject matter of any of Examples 44-56, and further including means for transforming the training speech data of each training speaker of the one or more training speakers based on the articulatory parameter data.

Example 58 includes the subject matter of any of Examples 44-57, and wherein the training speaker training data associated with the one or more training speakers comprises one or more training speaker parameters of the automatic speech recognition algorithm.

Example 59 includes the subject matter of any of Examples 44-58, and wherein the one or more parameters comprise the one or more training speaker parameters.

Example 60 includes the subject matter of any of Examples 44-59, and wherein the means for transcribing the speech data comprises means for determining, using an acoustic model, phonemes of the speech data; and means for determining, using a language model, words of the speech data based on the phonemes.

Example 61 includes the subject matter of any of Examples 44-60, and wherein the means for acquiring the speech data of the speaker comprises means for capturing speech data of a speaker.

Example 62 includes the subject matter of any of Examples 44-61, and further including means for performing an action based on the transcribed speech data.

The invention claimed is:
1. An automatic speech recognition device comprising:
an articulatory parameter determination circuit to acquire articulatory parameter data indicative of one or more articulatory parameters of a speaker; and an automatic speech recognition algorithm parameter determination circuit to determine, based on the articulatory parameter data, one or more parameters of an automatic speech recognition algorithm.

2. The automatic speech recognition device of claim 1, wherein the articulatory parameter data comprises visible articulatory parameter data.

3. The automatic speech recognition device of claim 2, wherein the visible articulatory parameter data is indicative of a facial structure of the speaker.

4. The automatic speech recognition device of claim 2, wherein the visible articulatory parameter data is indicative of at least one of a tongue radius, a tongue height, a jaw angle, a lip protrusion, or a lip height.

5. The automatic speech recognition device of claim 1, further comprising a camera and an image data capture circuit to capture an image of the speaker, wherein to acquire the articulatory parameter data indicative of the one or more articulatory parameters of the speaker comprises to determine articulatory parameter data indicative of one or more articulatory parameters of the speaker based on the image.

6. The automatic speech recognition device of claim 1, wherein to determine the one or more parameters of the automatic speech recognition algorithm comprises to:
acquire, based on the articulatory parameter data, training data associated with one or more training speakers; and
determine one or more parameters of an automatic speech recognition algorithm based on the training data.

7. The automatic speech recognition device of claim 6, further comprising a training speaker database comprising a plurality of entries, wherein to acquire the training data associated with the one or more training speakers comprises to access the training speaker database,
wherein each entry of the plurality of entries is associated with a different training speaker,
wherein each entry of the plurality of entries comprises a training data set, and
wherein each training data set comprises a training speaker articulatory parameter data set associated with the corresponding different training speaker and training speaker training data associated with the corresponding different training speaker.

8. The automatic speech recognition device of claim 7, wherein to acquire the training data associated with the one or more training speakers comprises to select, by the automatic speech recognition device and based on the articulatory parameter data and the plurality of training speaker articulatory parameter data sets of the training speaker database, training speaker training data associated with one or more training speakers from the training speaker database.

9. The automatic speech recognition device of claim 8, wherein the articulatory parameter determination circuit is further to perform a comparison of the articulatory parameter data and the plurality of training speaker articulatory parameter data sets of the training speaker database,
wherein to select the training speaker training data associated with the one or more training speakers comprises to select, based on the comparison, one or more entries of the plurality of entries with training articulatory parameter data similar to the articulatory parameter data.

10. The automatic speech recognition device of claim 8, wherein the training speaker training data associated with the one or more training speakers comprises training speech data of each training speaker of the one or more training speakers and corresponding transcribed text data.

11. The automatic speech recognition device of claim 10, wherein the automatic speech recognition algorithm parameter determination circuit is further to:
acquire speech data of the speaker;
transform the training speech data of each training speaker of the one or more training speakers based on the speech data.

12. A method for automatic speech recognition comprising:
acquiring, by an automatic speech recognition device, speech data of a speaker;
acquiring, by the automatic speech recognition device, articulatory parameter data indicative of one or more articulatory parameters of the speaker;
determining, by the automatic speech recognition device and based on the articulatory parameter data, one or more parameters of an automatic speech recognition algorithm
transcribing, by the automatic speech recognition device, the speech data with the automatic speech recognition algorithm using the one or more parameters.

13. The method of claim 12, wherein the articulatory parameter data comprises visible articulatory parameter data.

14. The method of claim 13, wherein the visible articulatory parameter data is indicative of at least one of a tongue radius, a tongue height, a jaw angle, a lip protrusion, or a lip height.

15. The method of claim 12, further comprising acquiring, by the automatic speech device, an image of the speaker, wherein acquiring the articulatory parameter data comprises determining, by the automatic speech recognition device, articulatory parameter data indicative of one or more articulatory parameters of the speaker based on the image.

16. The method of claim 12, wherein determining the one or more parameters of the automatic speech recognition algorithm comprises:
acquiring, by the automatic speech recognition device and based on the articulatory parameter data, training data associated with one or more training speakers; and
determining, by the automatic speech recognition device and based on the training data, one or more parameters of an automatic speech recognition algorithm.

17. One or more non-transitory computer-readable storage media comprising a plurality of instructions stored thereon that, in response to being executed, result in a compute device:
acquiring speech data of a speaker;
acquiring articulatory parameter data indicative of one or more articulatory parameters of the speaker;
determining, based on the articulatory parameter data, one or more parameters of an automatic speech recognition algorithm
transcribing the speech data with the automatic speech recognition algorithm using the one or more parameters.

18. The one or more non-transitory computer-readable storage media of claim 17, wherein the articulatory parameter data comprises visible articulatory parameter data.

19. The one or more non-transitory computer-readable storage media of claim 18, wherein the visible articulatory parameter data is indicative of at least one of a tongue radius, a tongue height, a jaw angle, a lip protrusion, or a lip height.

20. The one or more non-transitory computer-readable storage media of claim 17, wherein the plurality of instructions further result in the compute device acquiring an image of the speaker, wherein acquiring the articulatory parameter data comprises determining articulatory parameter data indicative of one or more articulatory parameters of the speaker based on the image.

21. The one or more non-transitory computer-readable storage media of claim 17, wherein determining the one or more parameters of the automatic speech recognition algorithm comprises:

acquiring, based on the articulatory parameter data, training data associated with one or more training speakers; and determining, based on the training data, one or more parameters of an automatic speech recognition algorithm.

22. The one or more non-transitory computer-readable storage media of claim 21, wherein acquiring the training data associated with the one or more training speakers comprises accessing a training speaker database comprising a plurality of entries, wherein each entry of the plurality of entries is associated with a different training speaker, wherein each entry of the plurality of entries comprises a training data set, and wherein each training data set comprises a training speaker articulatory parameter data set associated with the corresponding different training speaker and training speaker training data associated with the corresponding different training speaker.

23. The one or more non-transitory computer-readable storage media of claim 22, wherein acquiring the training data associated with the one or more training speakers comprises selecting, based on the articulatory parameter data and the plurality of training speaker articulatory parameter data sets of the training speaker database, training speaker training data associated with one or more training speakers from the training speaker database.

24. The automatic speech recognition device of claim 1, wherein the automatic speech recognition algorithm is a machine-learning-based algorithm, wherein to determine, based on the articulatory parameter data, the one or more parameters of the automatic speech recognition algorithm comprises to determine, based on the articulatory parameter data, the one or more parameters of the machine-learning-based algorithm.

25. The automatic speech recognition device of claim 24, further comprising an automatic speech recognition algorithm circuit to transcribe, with use of the one or more parameters of the machine-learning-based algorithm, the speech data without determination of phonemes of the speech data.

\* \* \* \* \*